United States Patent
Bergami (10) Patent No.: US 10,723,475 B2
(45) Date of Patent: Jul. 28, 2020

(54) AIR INTAKE UNIT FOR AN AIRCRAFT ENGINE AND PROVIDED WITH AN AIR FILTER AND WITH AN AIR FILTER BYPASS DUCT

(71) Applicant: BMC S.r.l., Medicina (IT)

(72) Inventor: Gaetano Bergami, Medicina (IT)

(73) Assignee: BMC S.R.L. (IT)

(*) Notice: Subject to any disclaimer, the term of this patent is extended or adjusted under 35 U.S.C. 154(b) by 264 days.

(21) Appl. No.: 15/958,312

(22) Filed: Apr. 20, 2018

(65) Prior Publication Data

US 2018/0305035 A1  Oct. 25, 2018

(30) Foreign Application Priority Data

Apr. 21, 2017  (IT) .................. 102017000044153

(51) Int. Cl.
*B01D 45/00* (2006.01)
*B64D 33/02* (2006.01)
(Continued)

(52) U.S. Cl.
CPC .............. *B64D 33/02* (2013.01); *B64C 27/04* (2013.01); *F02C 7/042* (2013.01); *F02C 7/055* (2013.01);
(Continued)

(58) Field of Classification Search
CPC .............. B64D 33/02; B64D 2033/022; B64D 2033/0246; B64C 27/04; F02C 7/042;
(Continued)

(56) References Cited

U.S. PATENT DOCUMENTS

2002/0182062 A1* 12/2002 Scimone ................ B64D 33/02
415/121.2
2007/0022723 A1* 2/2007 Stelzer ................... B64D 33/02
55/502

(Continued)

FOREIGN PATENT DOCUMENTS

| EP | 3121414 A1 | 1/2017 |
|----|-----------|--------|
| EP | 3121415 A1 | 1/2017 |
| EP | 3121416 A1 | 1/2017 |

OTHER PUBLICATIONS

Italian Search Report issued in Application No. IT 2017000044153 dated Feb. 22, 2018.

*Primary Examiner* — Dung H Bui
(74) *Attorney, Agent, or Firm* — Workman Nydegger (57) ABSTRACT

An air intake unit for an engine of an aircraft and having: a housing, inside which a plenum is defined, which can be connected to the engine of the aircraft; a main intake opening; an air filter which engages the main intake opening; a bypass intake opening; a shutter device, which is coupled to the bypass intake opening and has two partitions, which are mounted so as to rotate around respective rotation axes parallel to and spaced apart from one another; and an actuator, which moves the shutter device between a closed position and an open position. In the open position of the shutter device, an upper partition is arranged transversely to the wall of the housing and in a central area of the bypass intake opening, and a lower partition is arranged parallel to the wall of the housing and overlaps said wall.

18 Claims, 5 Drawing Sheets

(51) Int. Cl.
*F02C 7/055* (2006.01)
*F02C 7/042* (2006.01)
*B64C 27/04* (2006.01)
*F02C 7/057* (2006.01)
*B01D 46/00* (2006.01)

(52) U.S. Cl.
CPC .......... *F02C 7/057* (2013.01); *B01D 46/0087* (2013.01); *B64D 2033/022* (2013.01); *B64D 2033/0246* (2013.01); *F05D 2220/329* (2013.01); *F05D 2260/56* (2013.01); *F05D 2260/57* (2013.01); *F05D 2260/606* (2013.01); *F05D 2260/607* (2013.01); *Y02T 50/672* (2013.01); *Y02T 50/675* (2013.01)

(58) Field of Classification Search
CPC ........ F02C 7/057; F02C 7/055; Y02T 50/675; Y02T 50/672; F05D 2260/606; F05D 2220/329; F05D 2260/607; F05D 2260/56; F05D 2260/57; B01D 46/0087
See application file for complete search history.

(56) References Cited

U.S. PATENT DOCUMENTS

| | | | |
|---|---|---|---|
| 2007/0025838 A1* | 2/2007 | Stelzer | B64D 33/02 415/121.2 |
| 2009/0261208 A1* | 10/2009 | Belyew | B01D 46/10 244/53 B |
| 2014/0077039 A1* | 3/2014 | Scimone | B64C 27/28 244/23 B |
| 2014/0158833 A1* | 6/2014 | Braeutigam | B64D 33/02 244/53 B |
| 2014/0260127 A1* | 9/2014 | Boyce | F02C 7/055 55/306 |
| 2018/0208323 A1* | 7/2018 | Parsons | B64D 33/02 |

* cited by examiner

AIR INTAKE UNIT FOR AN AIRCRAFT ENGINE AND PROVIDED WITH AN AIR FILTER AND WITH AN AIR FILTER BYPASS DUCT

PRIORITY CLAIM

This application claims priority from Italian Patent Application No. 102017000044153 filed on Apr. 21, 2017, the disclosure of which is incorporated by reference.

TECHNICAL FIELD

The present invention relates to an air intake unit for an engine of an aircraft, i.e. a man-made machine that supports itself and can move in the air allowing the transportation of people or objects in the Earth's atmosphere.

The present invention finds advantageous application in a helicopter, to which the following specification will make explicit reference without thereby losing generality.

PRIOR ART

A modern helicopter is provided with at least one engine which needs a continuous flow of fresh air for its operation; the term engine refers both to the main engines that operate the blade assembly and to the auxiliary engines (also referred to as APU—"Auxiliar Power Unit") which operate auxiliary services. In order to feed fresh air to each engine, the helicopter is equipped with at least one air intake that can be provided with a filtration system and a duct (also referred to as "the plenum"), which is arranged downstream of the filtration system and ends in the engine.

The suction of air through an air intake may be dynamic (also referred to as "RAM") when the dynamic pressure of the air generated by the helicopter motion is used to increase the intake static pressure and thus enhance the volumetric efficiency of the engine; in this case, the air intake is oriented (at least partially) perpendicular to the direction of the motion. Alternatively, the suction of air through an air intake may be static when the fresh air is drawn in only due to the negative pressure effect generated by the engine; in this case, the air intake is oriented laterally to the direction of the motion (therefore at a side or top wall of the fuselage).

A helicopter must be able to operate in a wide variety of environmental conditions and therefore each engine of the helicopter must be protected in order to be able to operate even in extreme environmental conditions: for example in the presence of a lot of dust, such as in sandy environments (beaches, deserts . . . ), or in the presence of many foreign bodies (such as dry leaves . . . ).

The greatest danger for helicopter engines is the ingestion of dust or other solid particles suspended in the atmosphere (both because of proper atmospheric motions and because of the effect of the helicopter blades). In order to protect the engines from these dangers, each intake unit can be equipped with at least one filtration system provided with its own air filter to stop the particles and thus protect the engines. The air filter can be of the barrier type (i.e. comprise one or more layers of particle-entrapping porous material), or of the centrifugal type (i.e. exploit the centrifugal force to separate the heavier solid particles from the incoming air flow).

The presence of a filtration system increases the engine life, but at the same time poses a potential threat to flight operations, as a filtration system can be totally or partially clogged in the case where the amount of accumulated solid particles or the flow rate of the particles exceeds the capacity of the air filter or in the case of ice formation. If a total or partial clogging of the filtration system occurs, the corresponding engine may undergo a significant (even total in the worst case scenario) power loss that can cause an accident. In order to always guarantee an adequate air flow towards the engine, even if the air filter is clogged, each filtration system is equipped with an alternative or secondary intake path (also known as a bypass path) that allows the engine to be fed with external air without passing through the air filter; in this way, the safe and correct operation of the engines is ensured in all flight conditions.

Patent applications EP2282031A1, GB1201096A and EP3121416A1 describe an air intake unit for an aircraft engine, wherein the air filter is mounted so that it can move (for example by means of a rotary movement) in order to free the bypass path, when necessary.

Patent applications EP3121415A1 and EP3121416A1 describe an air intake unit for an aircraft engine, wherein there is provided a main intake opening permanently engaged by an air filter and a bypass intake opening provided with a shutter device movable between a closed position, in which it closes the bypass intake opening, and an open position, in which it allows free passage through the bypass intake opening.

DESCRIPTION OF THE INVENTION

The object of the present invention is to provide an air intake unit for an aircraft engine, the former being provided with an air filter and an air filter bypass duct and allowing the performance to be optimized when the bypass duct is used, i.e. when the bypass duct is opened to bypass the air filter.

According to the present invention, an air intake unit for an aircraft engine, the former being provided with an air filter and an air filter bypass duct, is provided as claimed in the appended claims.

The claims describe preferred embodiments of the invention forming an integral part of the present specification.

BRIEF DESCRIPTION OF THE DRAWINGS

The present invention will now be described with reference to the accompanying drawings, which illustrate a non-limiting embodiment thereof, in which.

PREFERRED EMBODIMENTS OF THE INVENTION

Figure 1:
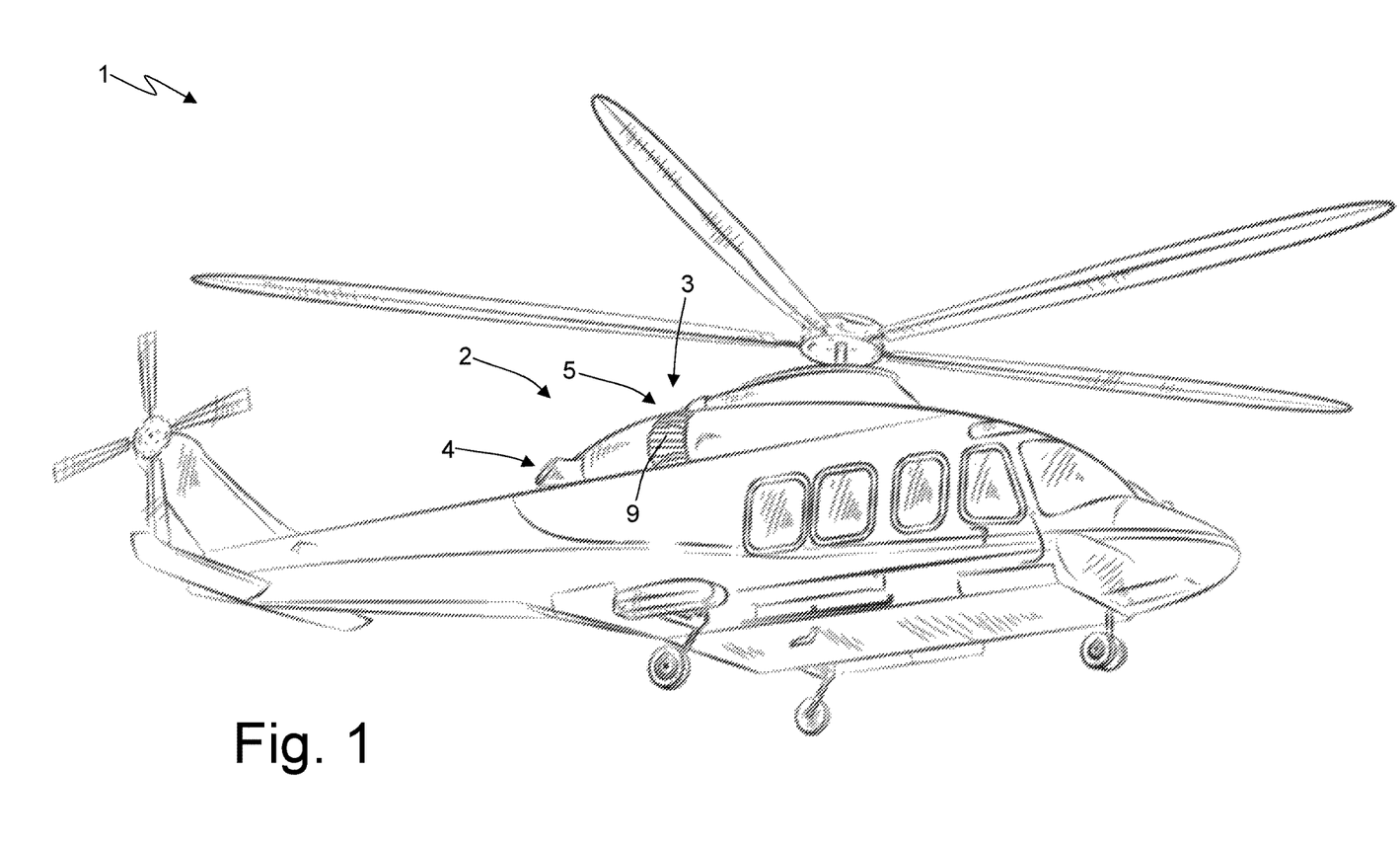
FIG. 1 is a schematic and perspective view of a helicopter comprising a pair of twin turbine engines, each of which is provided with an air intake unit made in accordance with the present invention.
Figure 2:
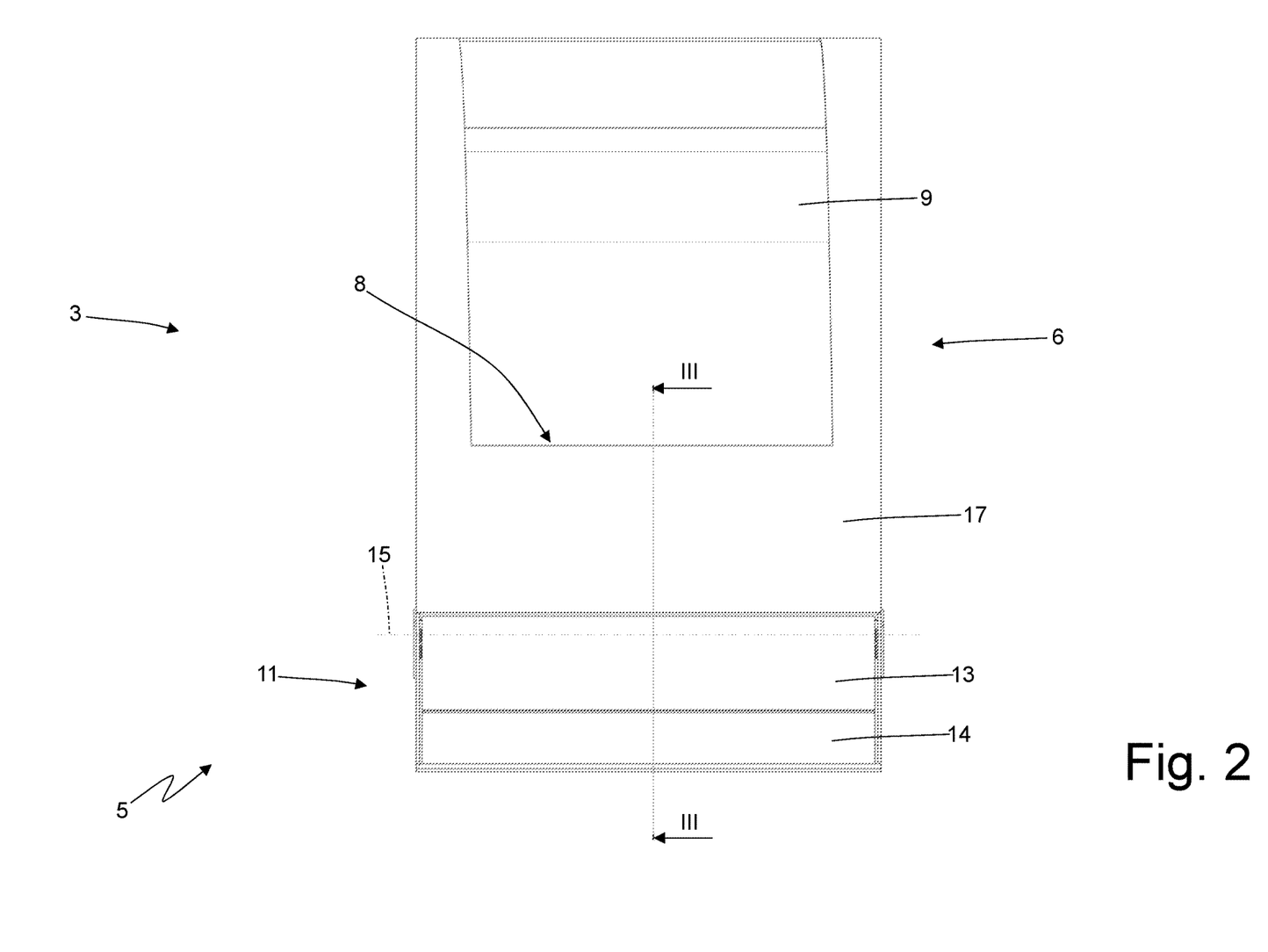
FIG. 2 is a front view of one of the two air intake units in FIG. 1 with a bypass duct in the closed configuration.
Figure 3:
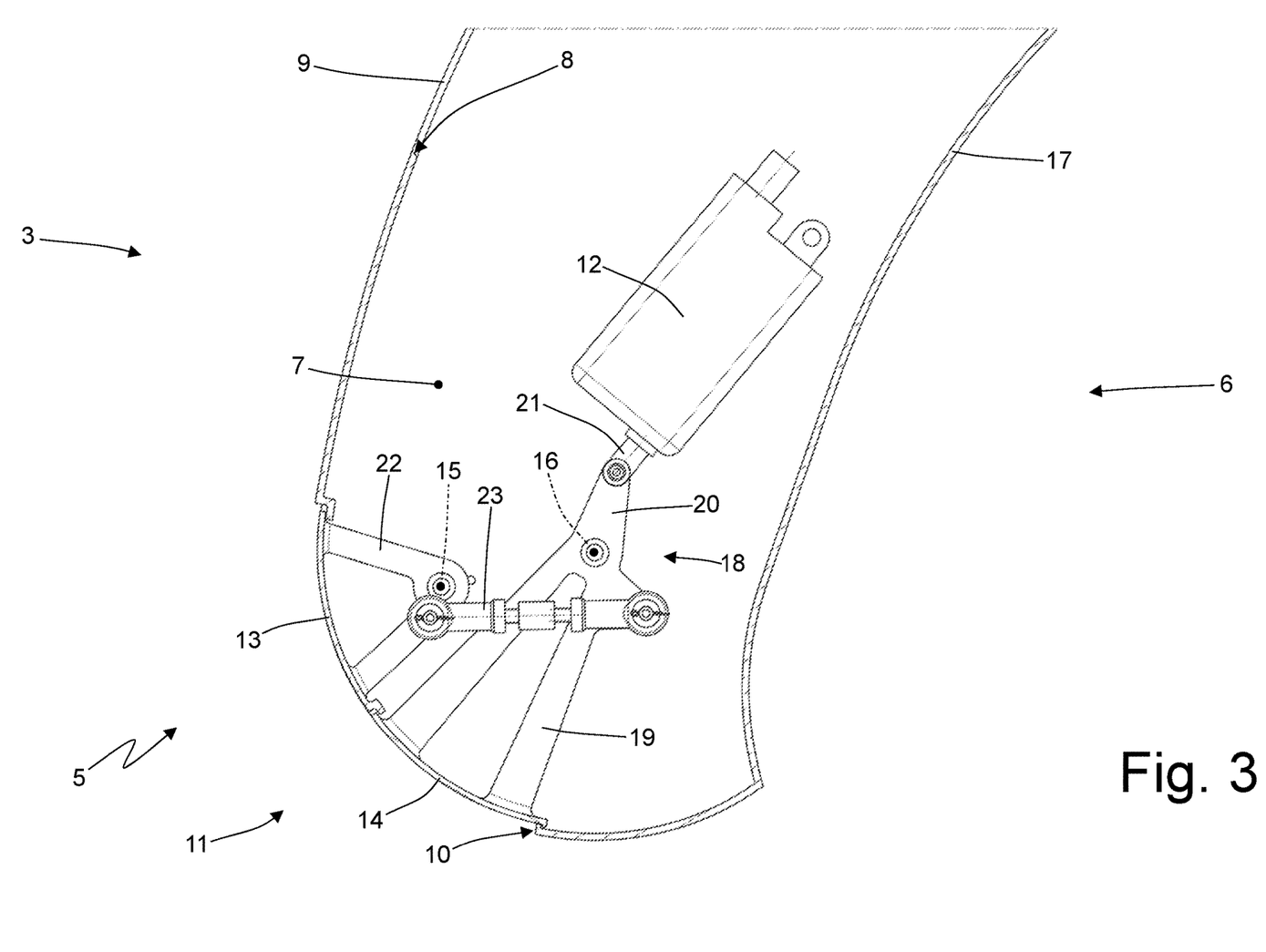
FIG. 3 is a sectional view along the line III-III of part of the air intake unit in FIG. 2 with the bypass duct in the closed configuration.

In FIG. 1, the numeral 1 indicates, as a whole, a helicopter comprising two twin turbine engines 2 (only one of which is visible in FIG. 1), which operate a blade assembly which allows the helicopter to rise and descend vertically, remain stationary in flight, move sideways, backwards or forwards.

Each turbine engine 2 comprises a tubular housing having an air inlet opening 3 at the front (through which the turbine engine 2 sucks in the external air required for its operation, i.e. external air containing oxygen required for combustion) and an air outlet opening 4 at the rear (through which the turbine engine 2 expels the exhaust gases produced by combustion). At the air inlet opening 3 of each turbine engine 2 there is an air intake unit 5 through which the air sucked by said turbine engine 2 flows.

As shown in FIGS. 2-5, each intake unit 5 comprises a hollow housing 6 inside which a plenum 7 (i.e. an intake chamber) is defined, which is in pneumatic communication with the turbine engine 2. Each housing 6 comprises a main intake opening 8 through which the external air required for the operation of the turbine engine 2 can be sucked; in other words, the external air required for the operation of each turbine engine 2 can enter the plenum 7 by passing through the main intake opening 8 and then from the plenum 7 reach the turbine engine 2. In the embodiment illustrated in the attached figures, each housing 6 comprises a single main intake opening 8, however according to other, not shown and perfectly equivalent embodiments, each housing 6 comprises a plurality of main intake openings 8 abreast of each other.

Each intake unit 5 comprises an air filter 9 that is supported by the housing 6 and engages the whole main intake opening 8 in order to filter the external air flowing through said main intake opening 8 and entering the plenum 7; in other words, the air filter 9 reproduces the shape of the main intake opening 8 so as to engage with no play the main intake opening 8 and then filter all the air passing through the main intake opening 8 and entering the plenum 7. Preferably, each air filter 9 comprises a rectangular-shaped support frame (made of aluminium, plastic material or composite material), which is fixed to the outer wall of the housing 6 and supports one or more filter material panels (for example made of cotton or other fibre fabric or non-woven fabric sandwiched between two layers of thin metal mesh that give shape and strength to said filter material).

Each housing 6 also comprises a bypass intake opening 10, which is completely separate from and independent of the main intake opening 8 (thus of the air filter 9) and arranged alongside the main intake opening 8; in particular, in the embodiment illustrated in the attached figures, the bypass intake opening 10 is arranged underneath the main intake opening 8. The external air required for the operation of the turbine engine 2 can be sucked through each bypass intake opening 10; in other words, the external air required for the operation of each turbine engine 2 can enter the plenum 7 by passing through the bypass intake opening 10 and then from the plenum 7 reach the turbine engine 2. In the embodiment illustrated in the attached figures, each housing 6 comprises a single bypass intake opening 10, however according to other, not shown and perfectly equivalent embodiments, each housing 6 comprises a plurality of bypass intake openings 10 abreast of each other.

Each intake unit 5 comprises a shutter device 11, which is coupled to the bypass intake opening 10 and movably mounted so that it can move between a closed position (illustrated in FIGS. 2 and 3), in which it closes the bypass intake opening 10 (to prevent the air from entering through the bypass intake opening 10), and an open position (illustrated in FIGS. 4 and 5), in which it allows free passage through the bypass intake opening 10 (to allow the air to enter through the bypass intake opening 10).

Lastly, each intake unit 5 comprises an actuator 12, which moves the shutter device 11 between the closed position and the open position.

When each shutter device 11 is in the closed position (shown in FIGS. 2 and 3), the external air can only enter the plenum 7 (and thus reach the turbine engine 2) by passing through the main intake opening 8 and thus passing through the air filter 9. Instead, when each shutter device 11 is in the open position (shown in FIGS. 4 and 5), the external air can enter the plenum 7 (and thus reach the turbine engine 2) both by passing through the main intake opening 8, thus passing through the air filter 9, and by passing through the bypass intake opening 10, thus without passing through the air filter 9 (as the bypass intake opening 10 is devoid of filtering material it presents no obstacle to the passage of air). Obviously, when each shutter device 11 is in the open position (shown in FIGS. 4 and 5), almost all of the air entering the plenum 7 to reach the turbine engine 2 passes through the bypass intake opening 10 rather than through the main intake opening 8 engaged by the air filter 9, since the crossing of the bypass intake opening 10 results in lower load losses.

When each shutter device 11 is in the closed position (shown in FIGS. 2 and 3), the intake air necessarily passes through the main intake opening 8 and through the air filter 9; therefore, any impurities present in the air are blocked by the air filter 9, however, the passage through the air filter 9 causes load loss in the intake air, which penalizes the performance of the turbine engine 2. On the other hand, when each shutter device 11 is in the open position (shown in FIGS. 4 and 5), the intake air mainly passes through the bypass intake opening 10 and any impurities present in the air are not blocked by the air filter 9; therefore, no loss of load occurs in the intake air, however, any impurities present in the air are not blocked by the air filter 9.

Figure 4:
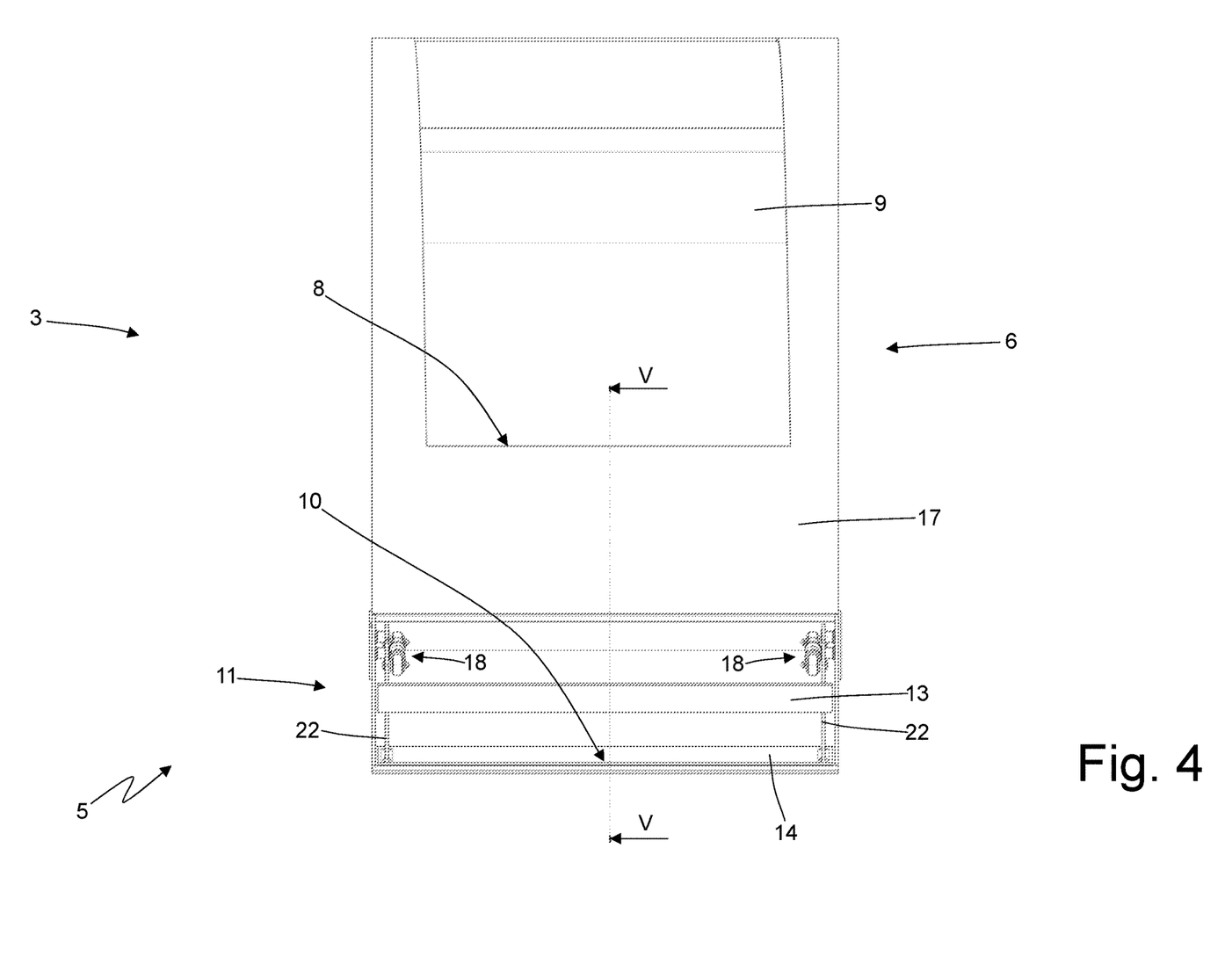
FIG. 4 is a front view of the air intake unit in FIG. 2 with the bypass duct in the open configuration.
Figure 5:
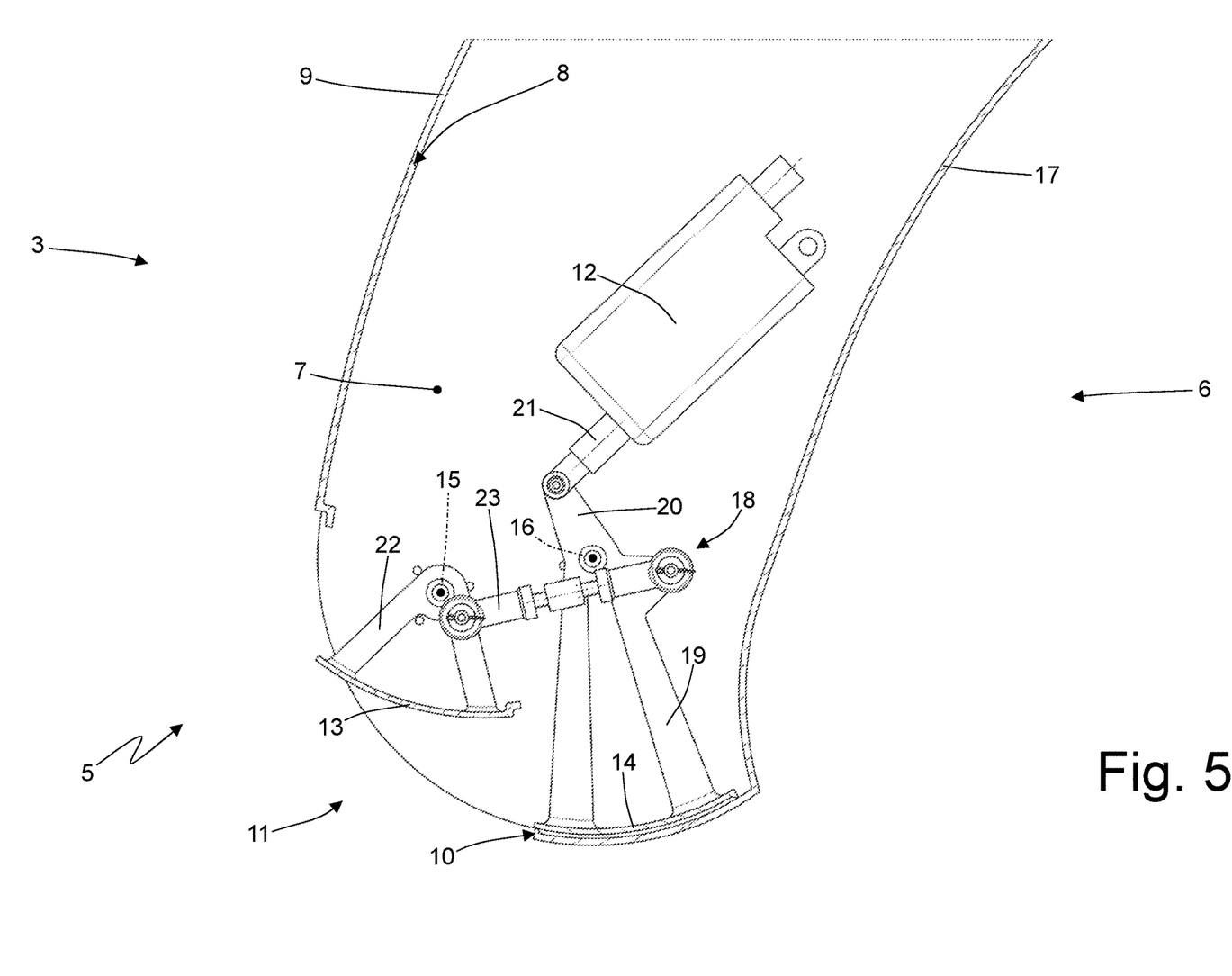
FIG. 5 is a sectional view along the line V-V of part of the air intake unit in FIG. 2 with the bypass duct in the closed configuration.

Each air intake unit 5 comprises an electronic control unit, which drives the actuator 12 to move the shutter device 11 between the closed position (shown in FIGS. 2 and 3) and the open position (shown in FIGS. 4 and 5). In particular, when the helicopter 1 is close to the ground (during take-off or landing or when stationary at low altitude), the intake air possibly (probably) contains impurities, therefore each shutter device 11 is arranged and maintained by the electronic control unit in the closed position for filtering the intake air; instead, when the helicopter 1 is high above the ground (i.e. far from the ground, for example at a height of several tens of metres), it is very unlikely that the intake air contains impurities, therefore each shutter device 11 is arranged and maintained by the electronic control unit in the open position in order to avoid (unnecessary) penalization of the performance of the turbine engine 2.

In addition, each electronic control unit is connected to a pressure sensor, which is arranged in the plenum 7 and measures the pressure of the intake air after it has passed through the air filter 9; when the intake air pressure measured by the pressure sensor is lower than a threshold value, the corresponding shutter device 11 is arranged and maintained by the electronic control unit in the open position (shown in FIGS. 4 and 5) regardless of the proximity of the helicopter 1 to the ground. In other words, the intake air pressure measured by each pressure sensor indicates the clogging of the corresponding air filter 9, since the more the air filter 9 is clogged, the less is the intake air pressure measured by the pressure sensor; therefore, when the air filter 9 is too clogged up, i.e. when the intake air pressure measured by the pressure sensor is lower than a threshold value, each shutter device is arranged and maintained by the electronic control unit in the open position (shown in FIGS. 4 and 5) to avoid over-penalizing the performance of the turbine engine 2.

Each shutter device 11 comprises an upper partition 13 and a lower partition 14, which in the closed position (shown in FIGS. 2 and 3) are arranged side by side in order to completely cover the bypass intake opening 10. In each shutter device 11 the upper partition 13 is rotatably mounted so as to rotate about a rotation axis 15 between the closed position (shown in FIGS. 2 and 3) and the open position (shown in FIGS. 4 and 5) and the lower partition 14 is rotatably mounted so as to rotate about a rotation axis 17 parallel to and spaced apart from the rotation axis 16 between the closed position (shown in FIGS. 2 and 3) and the open position (shown in FIGS. 4 and 5). Preferably, in each shutter device 11, both the partitions 13 and 14 rotate in the same direction (counterclockwise as shown in the accompanying figures) in order to move from the closed position (shown in FIGS. 2 and 3) to the open position (shown in FIGS. 4 and 5), and, accordingly, both the partitions 13 and 14 rotate in the same direction (clockwise as shown in the accompanying figures) in order to move from the open position (shown in FIGS. 4 and 5) to the closed position (shown in FIGS. 2 and 3).

According to a preferred embodiment shown in the attached figures, in the closed position (shown in FIGS. 2 and 3), the upper partition 13 and the lower partition 14 of each shutter device 11 are flush with a wall 17 of the housing 6 so as to seamlessly connect the two ends of the wall 17 at the opposite sides of the bypass intake opening 10; in other words, in the closed position (shown in FIGS. 2 and 3) the partitions 13 and 14 of each shutter device 11 are tangent to the wall 17 of the housing 6 and are also tangent to one another. To ensure a good air tightness in the closed position (shown in FIGS. 2 and 3), in each shutter device 11 the edges of the partitions 13 and 14 and/or the edges of the wall 17 of the housing 6 at the bypass intake opening 10 have respective elastic gaskets.

According to a preferred embodiment shown in the attached figures, in the open position (shown in FIGS. 4 and 5) in each shutter device 11 the upper partition 13 is arranged transversely to the wall 17 of the housing 6 and in a central area of the bypass intake opening 10 and the lower partition 14 is arranged parallel to the wall 17 of the housing 6 and overlaps said wall 17 (in particular inside the plenum 7, i.e. facing an inner surface of the wall 17). In other words, in the open position (shown in FIGS. 4 and 5) in each shutter device 11 the upper partition 13 is arranged in the middle of the bypass intake opening 10 and acts as a flow deflector, which directs the air towards the plenum 7, whereas the lower partition 14 is completely on the outside of the bypass intake opening 10.

In each shutter device 11, the lower partition 14 is carried by at least one rocker arm 18, which is hinged to the wall 17 of the housing 6 so as to rotate about the rotation axis 16 (in fact, two rocker arms 18 are preferably arranged at the opposite sides of the lower partition 14); the rocker arm 18 has an outer arm 19, which is "V"-shaped and rigidly connected to the lower partition 14, and an inner arm 20, which is opposite the outer arm 19, relative to the rotation axis 16, and mechanically connected to the actuator 12. In particular, the actuator 12 is a linear (pneumatic, hydraulic or electric) actuator comprising a slider 21, which moves linearly and is hinged to one end of the inner arm 20 of the rocker arm 18; in this way, the linear movement of the slider 21 of the actuator 12 causes the rotation of the rocker arm 18 about the rotation axis 16 and therefore a consequent rotation of the lower partition 14 about the rotation axis 16.

In each shutter device 11, the upper partition 13 is carried by at least one support arm 22, which is "V"-shaped and hinged to the wall 17 of the housing 6 so as to rotate about the rotation axis 15 (in fact, two support arms 22 are preferably arranged at the opposite sides of the upper partition 13). There is provided an interconnection arm 23, which connects the rocker arm 18 (in particular, the outer arm 19 of the rocker arm 18) to the support arm 22, so as to make the rocker arm 18 angularly integral with the support arm 22 and, hence, transmit the rotary movement of the rocker arm 18 to the support arm 22. According to a preferred embodiment, the interconnection arm 23 has an adjustable (i.e. editable) length, for example through a screw system, in order to allow the adjustment, in use, of the transmission of the rotary movement of the rocker arm 18 to the support arm 22.

To summarize, each actuator 12 simultaneously moves both the partitions 13 and 14 of the shutter device 11 thanks to the presence of the interconnection arm 23, which makes the two partitions 13 and 14 angularly integral with each other.

According to a possible (but not limiting) embodiment, a metal grid with relatively large meshes (in the size range of one or two centimetres), which has the function of preventing the entry of birds, may be arranged at each inlet opening 9 or 10.

The embodiment shown by way of example in the illustrated figures refers to a turbine engine 2, but the present invention may find advantageous application in any type of engine for an aircraft.

It is important to note that each air intake unit 5 as described above may be coupled to the main engine of the helicopter 1 or to an auxiliary engine of an Auxiliary Power Unit (APU); in other words, each air intake unit 5 as described above can be used in any situation where fresh air must be drawn in from the external environment for the operation of a (main or auxiliary) engine of the helicopter 1.

The embodiment shown by way of example in the illustrated figures refers to a helicopter 1, but the present invention may find advantageous application in any type of aircraft, therefore also an aeroplane.

The embodiments described herein may be combined with each other without departing from the scope of protection of the present invention.

The air intake unit 5 described above has many advantages.

The air intake unit 5 described above allows the aircraft 1 to operate safely in very dusty areas (therefore in areas where the air near the ground is full of impurities raised by the natural wind as well as by the air currents generated by the propulsion of the aircraft 1) thanks to the presence of the air filter 9, which, if necessary, is operated (by arranging the shutter device 11 in the closed position) to filter beforehand the air sucked by the turbine engine 2.

Moreover, the air intake unit 5 described above can operate for most of the flight without any performance penalization, since when the aircraft 1 is high above the ground (i.e. relatively far from the ground) the air filter is bypassed through the bypass intake opening 10 (by arranging the shutter device 11 in the open position).

The shape of the shutter device 11 of the air intake unit 5 described above allows the aerodynamic penalization (i.e. increased aerodynamic resistance during forward movement) to be null when the shutter device 11 is in the closed position, and to be minimal when the shutter device 11 is in the open position. In fact, in the closed position, the two partitions 13 and 14 of the shutter device 11 seamlessly complete the wall 17 of the housing 6 (i.e. the "body" of the helicopter 1), whereas in the open position the lower partition 14 "disappears" completely inside the plenum 7, while the upper partition 13 becomes a flow deflector, which allows the air to smoothly flow into the plenum 7 and protrudes very little beyond the dimensions of the housing 6.

Furthermore, the shape of the shutter device 11 makes it possible to minimize the force that must be exerted by the actuator device 12 to move the partitions 13 and 14 between the closed position and the open position.

The intake unit 5 described above is adaptable to any type of helicopter, has reduced overall dimensions, and is relatively simple to install even in existing helicopters not arranged in advance for this solution (i.e. it is suitable to be used as a retrofit solution to add a new functionality to an old system).

LIST OF REFERENCE NUMBERS IN THE FIGURES 1 helicopter
2 turbine engines
3 inlet opening
4 outlet opening
5 intake unit
6 housing
7 plenum
8 main intake opening
9 air filter
10 bypass intake opening
11 shutter device
12 actuator
13 upper partition
14 lower partition
15 rotation axis
16 rotation axis
17 wall
18 rocker arm
19 outer arm
20 inner arm
21 slider
22 support arm
23 interconnection arm

The invention claimed is:

1. An air intake unit for an engine of an aircraft; the intake unit comprises:
  a housing, inside which a plenum is defined, which can be connected to the engine of the aircraft;
  a main intake opening, which is obtained through a wall of the housing and through which the external air needed for the operation of the engine can be sucked into the plenum;
  at least one air filter, which is supported by the housing and engages the main intake opening so as to filter the external air flowing through said main intake opening;
  at least one bypass intake opening, which is obtained through a wall of the housing, is separate from and independent of the main intake opening and the air filter, and through which the external air needed for the operation of the engine can be sucked into the plenum;
  a shutter device, which is coupled to the bypass intake opening and is movable between a closed position, in which it closes the bypass intake opening, and an open position, in which it sets the passage through the bypass intake opening free; and
  an actuator, which moves the shutter device between the closed position and the open position;
  wherein the shutter device comprises two partitions, which are mounted so as to rotate around respective rotation axes parallel to and spaced apart from one another and, in the closed position, are flush with the wall of the housing so as to seamlessly connect the two ends of the wall at the opposite sides of the bypass intake opening; wherein the intake unit is configured such that:
  in the open position of the shutter device, an upper partition is arranged transversely to the wall of the housing and in a central area of the bypass intake opening; and
  in the open position of the shutter device, a lower partition is arranged parallel to the wall of the housing and overlaps said wall.

2. The air intake unit according to claim 1, wherein, in the open position of the shutter device, the lower partition is completely on the outside of the bypass intake opening.

3. The air intake unit according to claim 1, wherein, in the open position of the shutter device, the upper partition is arranged in the middle of the bypass intake opening and acts as a flow deflector, which directs the air towards the plenum.

4. The air intake unit according to claim 1, wherein, in the closed position of the shutter device, the partitions are tangent to the wall of the housing and are also tangent to one another.

5. The air intake unit according to claim 1, wherein both partitions rotate in the same direction in order to move from the closed position to the open position and vice versa.

6. The air intake unit according to claim 1, wherein the two partitions are angularly integral with one another so as to rotate together and in a synchronized manner around the corresponding rotation axes.

7. The air intake unit according to claim 1, wherein one lower partition is carried by at least one rocker arm, which is hinged so as to rotate around a first rotation axis.

8. The air intake unit according to claim 7, wherein the rocker arm comprises an outer arm, which is "V"-shaped and rigidly connected to the lower partition, and an inner arm, which is opposite the outer arm, relative to the first rotation axis, and mechanically connected to the actuator.

9. The air intake unit according to claim 8, wherein the actuator is a linear actuator and comprises a slider, which moves linearly and is hinged to one end of the inner arm of the rocker arm.

10. The air intake unit according to claim 7, wherein the upper partition is carried by at least one support arm, which is "V"-shaped and hinged so as to rotate around a second rotation axis.

11. The air intake unit according to claim 10, wherein there is provided an interconnection arm, which connects the rocker arm to the support arm, so as to make the rocker arm angularly integral with the support arm and, hence, transmit the rotation motion of the rocker arm to the support arm.

12. The air intake unit according to claim 11, wherein the interconnection arm has an adjustable length.

13. An air intake unit for an engine of an aircraft; the intake unit comprises:
  a housing, inside which a plenum is defined, which can be connected to the engine of the aircraft;
  a main intake opening, which is obtained through a wall of the housing and through which the external air needed for the operation of the engine can be sucked into the plenum;

at least one air filter, which is supported by the housing and engages the main intake opening so as to filter the external air flowing through said main intake opening;

at least one bypass intake opening, which is obtained through a wall of the housing, is separate from and independent of the main intake opening and the air filter, and through which the external air needed for the operation of the engine can be sucked into the plenum;

a shutter device, which is coupled to the bypass intake opening and is movable between a closed position, in which it closes the bypass intake opening, and an open position, in which it sets the passage through the bypass intake opening free; and an actuator, which moves the shutter device between the closed position and the open position;

wherein the shutter device comprises two partitions, which are mounted so as to rotate around respective rotation axes parallel to and spaced apart from one another and, in the closed position, are flush with the wall of the housing so as to seamlessly connect the two ends of the wall at the opposite sides of the bypass intake opening;

wherein the intake unit is configured such that:

in the open position of the shutter device, an upper partition is arranged transversely to the wall of the housing and in a central area of the bypass intake opening; and in the open position of the shutter device:

a lower partition is arranged parallel to the wall of the housing and overlaps said wall; and the lower partition is arranged on the inside of the plenum.

14. The air intake unit according to claim 13, wherein, in the open position of the shutter device, the lower partition is arranged so as to face an inner surface of the wall of the housing.

15. The air intake unit according to claim 13, wherein, in the open position of the shutter device, the lower partition is completely on the outside of the bypass intake opening.

16. The air intake unit according to claim 13, wherein, in the open position of the shutter device, the upper partition is arranged in the middle of the bypass intake opening and acts as a flow deflector, which directs the air towards the plenum.

17. The air intake unit according to claim 13, wherein, in the closed position of the shutter device, the partitions are tangent to the wall of the housing and are also tangent to one another.

18. An air intake unit for an engine of an aircraft; the intake unit comprises:

a housing, inside which a plenum is defined, which can be connected to the engine of the aircraft;

a main intake opening, which is obtained through a wall of the housing and through which the external air needed for the operation of the engine can be sucked into the plenum;

at least one air filter, which is supported by the housing and engages the main intake opening so as to filter the external air flowing through said main intake opening;

at least one bypass intake opening, which is obtained through a wall of the housing, is separate from and independent of the main intake opening and the air filter, and through which the external air needed for the operation of the engine can be sucked into the plenum;

a shutter device, which is coupled to the bypass intake opening and is movable between a closed position, in which it closes the bypass intake opening, and an open position, in which it sets the passage through the bypass intake opening free; and an actuator, which moves the shutter device between the closed position and the open position;

wherein the shutter device comprises two partitions, which are mounted so as to rotate around respective rotation axes parallel to and spaced apart from one another and, in the closed position, are flush with the wall of the housing so as to seamlessly connect the two ends of the wall at the opposite sides of the bypass intake opening;

wherein the intake unit is configured such that:

in the open position of the shutter device, an upper partition is arranged transversely to the wall of the housing and in a central area of the bypass intake opening; and in the open position of the shutter device:

a lower partition is arranged parallel to the wall of the housing and overlaps said wall; and the lower partition is arranged so as to face an inner surface of the wall of the housing.

* * * * *